(12) United States Patent
Heng et al.

(10) Patent No.: US 9,545,774 B1
(45) Date of Patent: Jan. 17, 2017

(54) REWORKING CERAMIC SANDWICH STRUCTURES

(75) Inventors: Sangvavann Heng, Buena Park, CA (US); Leanne L. Lehman, Aliso Viejo, CA (US); Kaia Elena David, La Habra Heights, CA (US); William Preston Keith, Lakewood, CA (US); Van Ha Ngo, Westminster, CA (US)

(73) Assignee: THE BOEING COMPANY, Chicago, IL (US)

( * ) Notice: Subject to any disclaimer, the term of this patent is extended or adjusted under 35 U.S.C. 154(b) by 980 days.

(21) Appl. No.: 13/290,537

(22) Filed: Nov. 7, 2011

(51) Int. Cl.
*B32B 7/08* (2006.01)
*B32B 18/00* (2006.01)

(52) U.S. Cl.
CPC ........ *B32B 7/08* (2013.01); *B32B 18/00* (2013.01)

(58) Field of Classification Search
CPC .......... B32B 7/02; B32B 2603/00; B32B 7/08; B32B 18/00; B32B 2250/40; B32B 5/06; Y10T 428/20; Y10T 156/1056; Y10T 156/10852; Y10T 428/24174; Y10T 428/249923; E04C 2/34; E04C 2002/3488
USPC ...... 428/63, 218, 119, 223; 264/36.1, 36.18; 156/94, 98, 252, 268
See application file for complete search history.

(56) References Cited

U.S. PATENT DOCUMENTS

| | | | |
|---|---|---|---|
| 4,358,480 A | 11/1982 | Ecord et al. | |
| 5,466,506 A * | 11/1995 | Freitas et al. | 428/105 |
| 5,736,222 A * | 4/1998 | Childress | 428/99 |
| 5,958,550 A * | 9/1999 | Childress | 428/119 |
| 6,027,798 A * | 2/2000 | Childress | 428/318.4 |
| 6,355,203 B1 * | 3/2002 | Charmes | B29C 73/04 156/98 |
| 6,820,334 B2 * | 11/2004 | Kebbede et al. | 29/889.1 |
| 7,500,833 B2 * | 3/2009 | Bublath et al. | 29/889.1 |
| 2003/0196305 A1 * | 10/2003 | Kebbede et al. | 29/402.11 |

(Continued)

FOREIGN PATENT DOCUMENTS

| | | |
|---|---|---|
| EP | 2017073 A2 | 1/2009 |
| JP | 200923348 A | 2/2009 |

OTHER PUBLICATIONS

"Bonded Repair of Aircraft Composite Sandwich Structures", U.S. Department of Transportation, Federal Aviation Administration, Final Report No. DOT/FAA/AR-03/74, Feb. 2004, pp. 2-4.*

(Continued)

*Primary Examiner* — Maria Veronica Ewald
*Assistant Examiner* — Ethan A Utt
(74) *Attorney, Agent, or Firm* — Yee & Associates, P.C.

(57) ABSTRACT

A method for reworking a ceramic structure. A portion of a first facesheet is removed from the ceramic structure to form a first aperture. The first facesheet comprises a number of layers of a first ceramic material. A portion of an inner section of the ceramic structure is removed to form a second aperture. The second aperture extends from the first aperture into the inner section. The inner section comprises a second ceramic material bonded to the first facesheet and has a lower density than the first facesheet. A ceramic replacement material is placed in the second aperture. A number of replacement ceramic layers are placed in the first aperture. Ceramic particles are placed between the first facesheet and the number of replacement ceramic layers. The ceramic particles are sintered to bond the number of replacement ceramic layers to the first facesheet.

17 Claims, 7 Drawing Sheets

(56) References Cited

U.S. PATENT DOCUMENTS

| | | | | |
|---|---|---|---|---|
| 2007/0289692 A1* | 12/2007 | Bogue | ................ | B29C 73/06 |
| | | | | 156/98 |
| 2009/0019685 A1* | 1/2009 | Keith et al. | ................ | 264/332 |
| 2009/0263627 A1* | 10/2009 | Hand et al. | ................ | 428/172 |
| 2010/0151189 A1* | 6/2010 | Chakrabarti | ............ | E04C 2/296 |
| | | | | 428/119 |
| 2011/0003077 A1* | 1/2011 | Heng | ................ | B32B 18/00 |
| | | | | 427/294 |
| 2011/0177285 A1* | 7/2011 | Bogue | ................ | B29C 73/06 |
| | | | | 428/116 |

OTHER PUBLICATIONS

"Composite Repair", Hexcel Composites, Apr. 1999, pp. 1-13.*
Zuoguang, Z., Jijun, H., Min, L., Yizuo, G., & Zhijie, S. (2009). Mechanical Performance of X-Truss/Foam Sandwich Construction. Journal of Reinforced Plastics and Composites, 28(21), 2631.*
"Bonded Repair of Aircraft Composite Sandwich Structures", U.S. Department of Transportation, Federal Aviation Administration, Final Report No. DOT/FAA/AR-03/74, Feb. 2004, pp. 1-121.
"Composite Repair," Hexcel Composites, Apr. 1999, 13 pp., accessed Nov. 7, 2011, http://www.hexcel.com/Resources/DataSheets/Brochure-Data-Sheets/Composite_Repair.pdf.

* cited by examiner

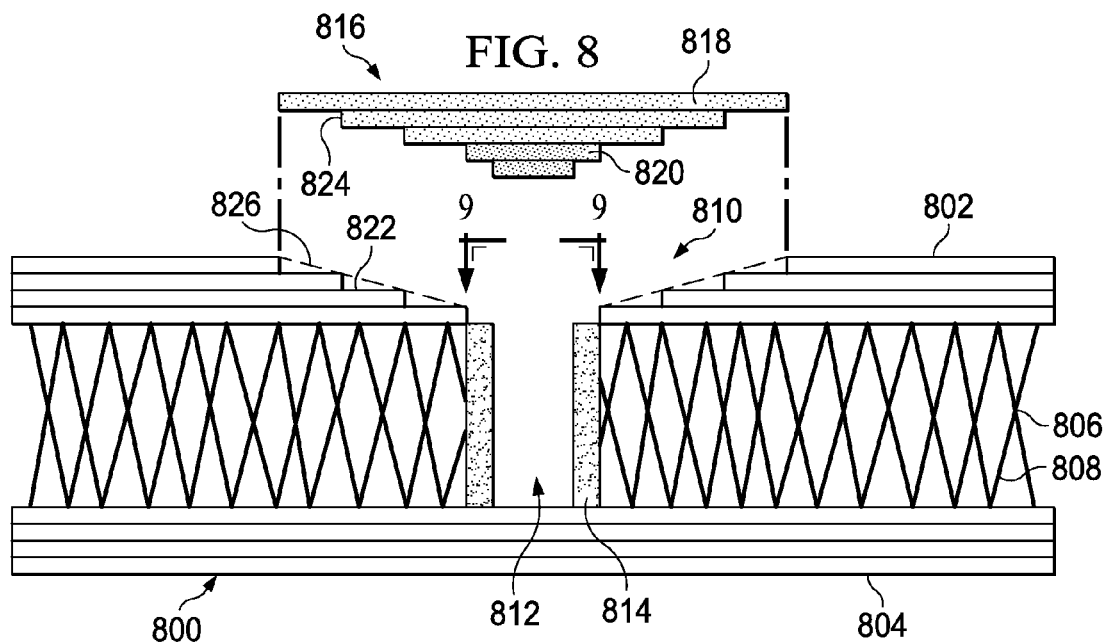
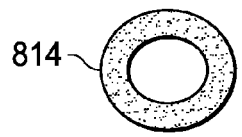
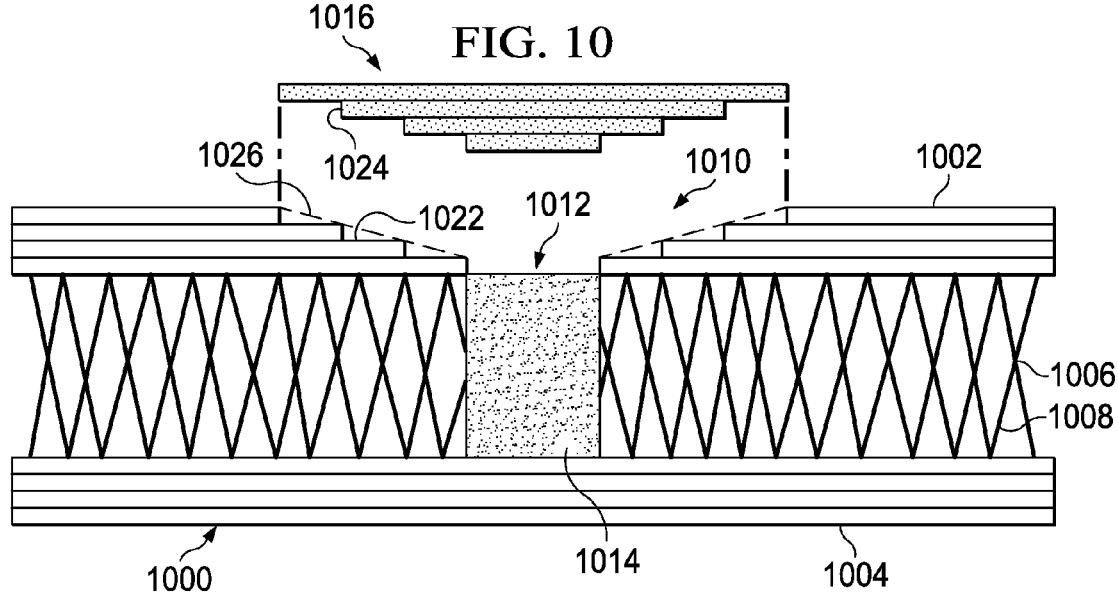

REWORKING CERAMIC SANDWICH STRUCTURES

BACKGROUND INFORMATION

1. Field

The present disclosure relates generally to ceramic materials and, in particular, to structures containing multiple layers of ceramic materials. Still more particularly, the present disclosure relates to a method and apparatus for reworking a ceramic matrix composite sandwich structure to restore the capability of the structure to carry both in-plane and out-of-plane loads.

2. Background

Various types of vehicles require thermal resistance or thermal protection systems. For example, some of the exterior surfaces of spacecraft require a capability to withstand temperatures that may be encountered during re-entry of the spacecraft into the atmosphere. As another example, jet engines, rocket engines, and power generators also have surfaces that are required to be capable of withstanding the operating temperatures that occur during the use of engines and generators.

A ceramic matrix composite material is a ceramic material consisting of two or more components. A ceramic matrix composite material typically includes a ceramic matrix component with additional components being incorporated to strengthen, toughen, or enhance thermal, physical, or other properties. For example, ceramic matrix composite materials may consist of ceramic fibers embedded in a ceramic matrix, thus forming a ceramic fiber reinforced ceramic material. The matrix and fibers may consist of any ceramic material.

Ceramic matrix composite materials are able to withstand a variety of operating environments. For example, ceramic matrix composite materials are able to withstand the operating temperatures that occur during re-entry of a space vehicle or during the use of engines and generators as described above.

Structures made of ceramic matrix composite materials may be used in aerospace and many other applications. For example, ceramic structures may be used to fabricate parts that are subjected to exhaust gasses in aircraft and other applications. Tiles wrapped with ceramic matrix composite materials may be used as part of a thermal protection system on the surface of a spacecraft. Ceramic matrix composite structures also may be used in various components. For example, these components may include, without limitation, a nozzle or combustion chamber for an engine or generator.

Ceramic matrix composite materials may be used to make a variety of structures. For example, ceramic tiles may take the form of a ceramic substrate with a facesheet that is wrapped around and bonded to the ceramic substrate. The facesheet may include a number of layers of ceramic matrix composite materials. Thus, ceramic tiles and other ceramic structures may include layers of ceramic matrix composite materials.

One type of ceramic matrix composite structure is a ceramic sandwich structure. A ceramic sandwich structure may include facesheets formed from consolidated layers of a ceramic matrix composite material. The facesheets are bonded to opposite sides of an interior section or core made of ceramic matrix composite materials to form the ceramic sandwich structure.

In one example, the core of a ceramic sandwich structure may be created by an array of pins made of ceramic matrix composite materials. The ceramic pins are arranged to form a truss core support structure between the facesheets. The pins extend through the thickness of the core and penetrate the facesheets. The pins provide load paths along which various loads are transferred between the facesheets. Such loads may include compressive, tensile, or shear loads or any of these or other loads in any combination.

Inconsistencies may occur in ceramic sandwich structures during the manufacturing or use of such structures. These inconsistencies may include, for example, delamination of layers in a facesheet, a facesheet de-bonding from the substrate, an impact forming a dent or crack in a facesheet and extending into the ceramic core, or other types of inconsistencies. Currently, these inconsistencies may require reworking to restore the structure to a desired level of operation.

The traditional approach for reworking these types of structures is to replace them. For example, a part containing an inconsistency is removed and a new part is put in place of the old part. However, replacement of parts may be costly and time consuming. Parts containing ceramic matrix composite materials may be expensive. In addition to the replacement operation itself being time consuming, the needed parts may not be on hand or may need to be specially manufactured. The turn-around of a vehicle including such a structure may be limited or reduced until the replacement can be made.

Therefore, it would be advantageous to have a method and apparatus that takes into account at least some of the issues discussed above, as well as possibly other issues.

SUMMARY

An illustrative embodiment of the present disclosure provides a method for reworking a ceramic structure. A portion of a first facesheet is removed from the ceramic structure to form a first aperture. The first facesheet comprises a number of layers of a first ceramic material. A portion of an inner section of the ceramic structure is removed to form a second aperture. The second aperture extends from the first aperture into the inner section. The inner section comprises a second ceramic material bonded to the first facesheet and has a lower density than the first facesheet. A ceramic replacement material is placed in the second aperture. A number of replacement ceramic layers are placed in the first aperture. Ceramic particles are placed between the first facesheet and the number of replacement ceramic layers. The ceramic particles are sintered to bond the number of replacement ceramic layers to the first facesheet.

Another illustrative embodiment of the present disclosure provides another method for reworking a ceramic structure. A portion of a first facesheet of the ceramic structure including an inconsistency is identified. The first facesheet comprises a number of layers of ceramic material. A slurry of ceramic particles is applied onto the portion of the first facesheet including the inconsistency. A number of ceramic layers are placed onto the portion of the first facesheet over the slurry of ceramic particles. The ceramic particles are sintered to bond the number of ceramic layers to the first facesheet over the inconsistency.

Another illustrative embodiment of the present disclosure provides a ceramic structure. A number of layers of a first ceramic material form a first facesheet of the ceramic structure. An inner section comprises a second ceramic material bonded to the first facesheet and has a lower density than the first facesheet. A ceramic replacement material is in the inner section. A number of replacement ceramic layers are bonded to the first facesheet adjacent to the ceramic replacement material.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof will best be understood by reference to the following detailed description of an illustrative embodiment of the present disclosure when read in conjunction with the accompanying drawings, wherein:

FIG. 8 is an illustration of reworking a ceramic structure in accordance with a first illustrative embodiment;

FIG. 9 is an illustration of a ceramic replacement material in accordance with an illustrative embodiment;

FIG. 10 is an illustration of reworking a ceramic structure in accordance with a second illustrative embodiment;

DETAILED DESCRIPTION

Figure 1:
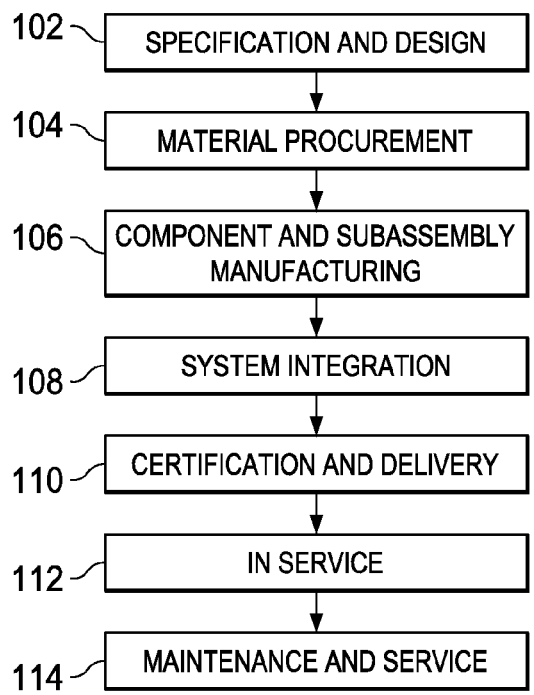
FIG. 1 is an illustration of a block diagram of an aerospace vehicle manufacturing and service method in accordance with an illustrative embodiment.

The different illustrative embodiments recognize and take into account a number of different considerations. "A number", as used herein with reference to items, means one or more items. For example, "a number of different considerations" are one or more different considerations.

The different illustrative embodiments recognize and take into account that a ceramic matrix composite truss core support structure is being developed for jet engine exhaust components on commercial aircraft and other applications. This sandwich structure includes multiple-layer ceramic matrix composite facesheets on opposite sides of an array of ceramic matrix composite pins forming a truss core support structure. The pins in the core structure are integrated with the facesheets via mechanical interlocking and co-curing.

The different illustrative embodiments also recognize and take into account that inconsistencies may occur in such a ceramic sandwich structure during manufacturing or during handling and operational use. These inconsistencies may include a delamination or de-bonding of individual layers in the facesheet as well as from the core material, cracks in a facesheet, dents in a facesheet that may extend into the core material, or other inconsistencies.

The different illustrative embodiments recognize and take into account that removing and replacing an entire part including a ceramic matrix composite sandwich structure is costly and time consuming. Therefore, a rework method that may be used to restore a ceramic sandwich structure with an inconsistency to its original strength without compromising its structural integrity is desired.

The different illustrative embodiments recognize and take into account that various methods are known for reworking polymer composite sandwich structures. These rework methods utilize polymer foaming adhesives, film adhesives, or core splice adhesives. These rework methods for polymer composite sandwich structures cannot be used to rework ceramic sandwich structures because such polymers will not withstand the temperatures and environments in which ceramic structures are used.

The different illustrative embodiments also recognize and take into account that methods are known for reworking ceramic matrix composite laminate structures. For example, repairing a ceramic laminate on the wing leading edge of a Space Shuttle may include filling an inconsistency with an ablator to enable reentry. The part including the inconsistency then is replaced after the Space Shuttle returns to the ground. Other methods for reworking ceramic matrix composite laminate structures are known. However, none of these methods are appropriate for reworking ceramic sandwich structures.

Thus, the different illustrative embodiments provide a method for reworking a ceramic sandwich structure. The structure is inspected to identify any inconsistencies. A portion of the ceramic matrix composite facesheet is removed, either partially through the thickness of the facesheet or through the thickness of the facesheet into the core material, in the area of any identified inconsistency. A portion of the inner section of the ceramic sandwich structure affected by the inconsistency also is removed through to a second facesheet on the other side of the ceramic sandwich structure. The inner section may be a core for the structure. Ceramic adhesive, such as in the form of a slurry including ceramic particles suspended in a ceramic slurry, is placed on the second facesheet where the inner section is removed. A ceramic replacement material, in the form of a ceramic plug, is placed into the inner section on the ceramic particles where the portion thereof was removed. A number of replacement layers of ceramic material is placed over the core ceramic replacement material to replace the layers of the facesheet that were removed. Ceramic adhesive, such as in the form of a slurry including ceramic particles suspended in a ceramic slurry, is placed between the core ceramic replacement material and the ceramic replacement layers of the facesheet. Overlay ceramic layers may be applied on the ceramic replacement layers to enhance robustness of the reworked area. The ceramic particles are cured and/or sintered to bond the number of replacement layers to the facesheet. Finishing operations then may be performed to restore the surface of the ceramic sandwich structure substantially to its original condition before the inconsistency occurred.

In another illustrative embodiment, it may be determined that the inconsistency only affects a portion of the facesheet and does not extend into the core of the ceramic sandwich structure. In this case, the ceramic sandwich structure may be reworked without removing a portion of the facesheet. A slurry of ceramic particles may be applied to the facesheet over the portion of the facesheet including the inconsistency. A number of replacement ceramic layers then may be placed onto the facesheet over the slurry of ceramic particles. The ceramic particles then may be cured and/or sintered to bond the replacement ceramic layers to the facesheet over the inconsistency.

Figure 2:
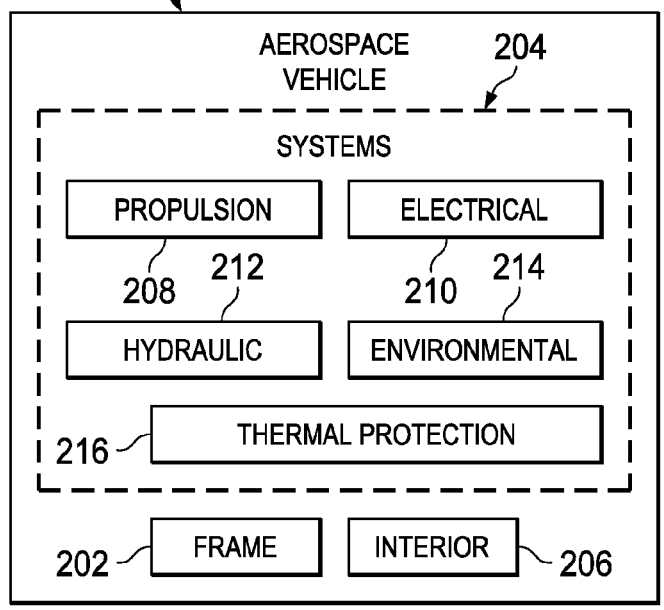
FIG. 2 is an illustration of a block diagram of an aerospace vehicle in which an illustrative embodiment may be implemented.

Referring more particularly to the drawings, embodiments of the disclosure may be described in the context of aerospace vehicle manufacturing and service method 100 as shown in FIG. 1 and aerospace vehicle 200 as shown in FIG. 2. Turning first to FIG. 1, an illustration of a block diagram of an aerospace vehicle manufacturing and service method is depicted in accordance with an illustrative embodiment.

During pre-production, aerospace vehicle manufacturing and service method 100 may include specification and design 102 of aerospace vehicle 200 in FIG. 2 and material procurement 104. During production, component and subassembly manufacturing 106 and system integration 108 of aerospace vehicle 200 in FIG. 2 takes place. Thereafter, aerospace vehicle 200 in FIG. 2 may go through certification and delivery 110 in order to be placed in service 112.

While in service by a customer, aerospace vehicle 200 in FIG. 2 is scheduled for routine maintenance and service 114, which may include modification, reconfiguration, refurbishment, and other maintenance or service. In this example, aerospace vehicle manufacturing and service method 100 is shown as a method for aerospace vehicles. The different illustrative embodiments may be applied to other types of manufacturing and service methods, including manufacturing and service methods for other types of platforms, including other types of vehicles.

Each of the processes of aerospace vehicle manufacturing and service method 100 may be performed or carried out by a system integrator, a third party, an operator, or by any combination of such entities. In these examples, the operator may be a customer. For the purposes of this description, a system integrator may include, without limitation, any number of aerospace vehicle manufacturers and major-system subcontractors; a third party may include, without limitation, any number of venders, subcontractors, and suppliers; and an operator may be a company, a military entity, a service organization, and so on.

With reference now to FIG. 2, an illustration of a block diagram of an aerospace vehicle in which an illustrative embodiment may be implemented is depicted. In this illustrative example, aerospace vehicle 200 is produced by aerospace vehicle manufacturing and service method 100 in FIG. 1. Aerospace vehicle 200 may include an aircraft, a spacecraft, or any other vehicle for traveling through the air, for traveling through space, or which is capable of operation in both air and space. Aerospace vehicle 200 may include frame 202 with plurality of systems 204 and interior 206.

Examples of plurality of systems 204 include one or more of propulsion system 208, electrical system 210, hydraulic system 212, environmental system 214, and thermal protection system 216. Illustrative embodiments may be used to rework ceramic components in plurality of systems 204. For example, without limitation, illustrative embodiments may be used to rework ceramic engine components and other ceramic components in propulsion system 208 and ceramic tiles or other ceramic structures in thermal protection system 216. Although an aerospace example is shown, different illustrative embodiments may be applied to other industries, such as the automotive industry.

Apparatuses and methods embodied herein may be employed during at least one of the stages of aerospace vehicle manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

In one illustrative example, components or subassemblies produced in component and subassembly manufacturing 106 in FIG. 1 may be fabricated or manufactured in a manner similar to components or subassemblies produced while aerospace vehicle 200 is in service 112 in FIG. 1.

As yet another example, a number of apparatus embodiments, method embodiments, or a combination thereof may be utilized during production stages, such as component and subassembly manufacturing 106 and system integration 108 in FIG. 1. "A number", when referring to items, means one or more items. For example, "a number of apparatus embodiments" is one or more apparatus embodiments. A number of apparatus embodiments, method embodiments, or a combination thereof may be utilized while aerospace vehicle 200 is in service 112, during maintenance and service 114, or both.

The use of a number of the different illustrative embodiments may substantially expedite the assembly of aerospace vehicle 200. A number of the different illustrative embodiments may reduce the cost of aerospace vehicle 200. For example, one or more of the different illustrative embodiments may be used during component and subassembly manufacturing 106, during system integration 108, or both. The different illustrative embodiments may be used during these parts of aerospace vehicle manufacturing and service method 100 to rework ceramic structures that may have undesired inconsistencies.

Further, the different illustrative embodiments also may be implemented during in service 112, during maintenance and service 114, or both, to rework inconsistencies that may be discovered in ceramic structures that may be present in aerospace vehicle 200. By allowing rework rather than replacement, the cost of new parts may be reduced or eliminated. Also, through reworking ceramic structures, one or more of the different illustrative embodiments may allow for aerospace vehicle 200 to continue operation with a desired level of performance more quickly as compared to waiting for a replacement part.

Figure 3:
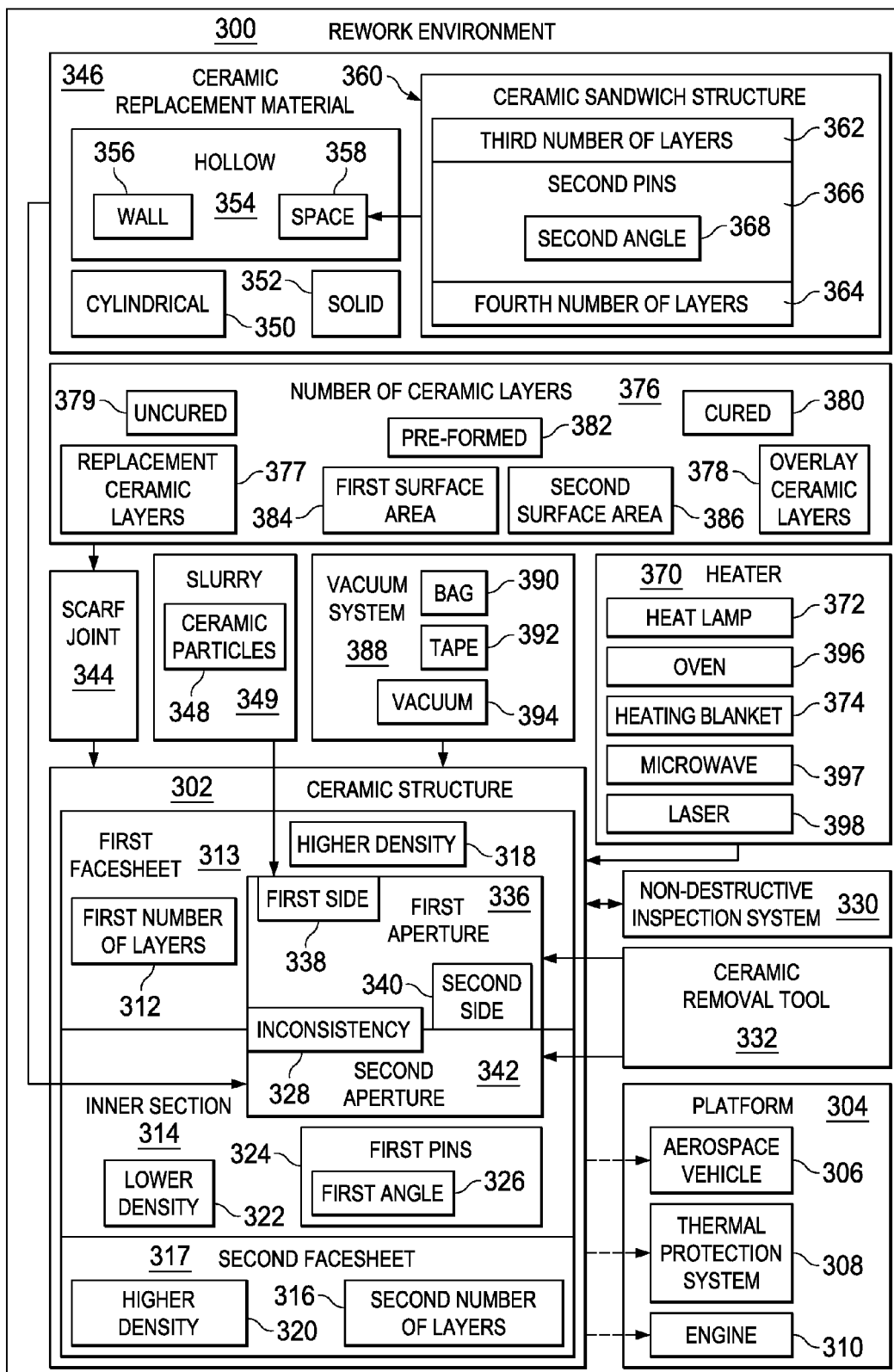
FIG. 3 is an illustration of a block diagram of a rework environment in accordance with an illustrative embodiment.

Turning now to FIG. 3, an illustration of a block diagram of a rework environment is depicted in accordance with an illustrative embodiment. Rework environment 300 in FIG. 3 may be used during manufacturing or maintenance of any vehicle or other platform or during manufacturing or maintenance of a part for the vehicle or other platform. For example, without limitation, rework environment 300 may be used during manufacturing or maintenance of aerospace vehicle 200 in FIG. 2, or during manufacturing or maintenance of a part for aerospace vehicle 200.

In this illustrative example, ceramic structure 302 may be located on platform 304. For example, without limitation, platform 304 may be aerospace vehicle 306 or another type of vehicle or other type of fixed or moveable platform. In these illustrative examples, ceramic structure 302 may be located in different portions of aerospace vehicle 306. For example, without limitation, ceramic structure 302 may be present in thermal protection system 308, engine 310, or in other suitable parts of aerospace vehicle 306.

Ceramic structure 302 is made of a number of ceramic materials. In the present application, including in the claims, the terms "ceramic" and "ceramic material" and similar terms include ceramic materials either alone or in combination with other materials. For example, without limitation, the terms "ceramic" and "ceramic material" includes ceramic matrix composite materials.

In accordance with an illustrative embodiment, ceramic structure 302 is a sandwich structure including first number of layers 312, inner section 314, and second number of layers 316. First number of layers 312 and second number of layers 316 may be formed of one or more layers or piles of a ceramic matrix composite material. First number of layers 312 may be first facesheet 313 and second number of layers 316 may be second facesheet 317. First facesheet 313 and second facesheet 317 form outer facesheets for ceramic structure 302. First facesheet 313 and second facesheet 317 also may be referred to as skins of ceramic structure 302.

Inner section 314 is bonded between first facesheet 313 and second facesheet 317. Inner section 314 thus may provide a support structure for first facesheet 313 and for second facesheet 317. Inner section 314 may be referred to as forming a core of ceramic structure 302. Inner section 314 also may be made of a ceramic matrix composite material.

In accordance with an illustrative embodiment, first facesheet 313 has higher density 318, second facesheet 317 has higher density 320, and inner section 314 has lower density 322. Higher density 318 of first facesheet 313 and higher density 320 of second facesheet 317 may or may not be the same density. However, both higher density 318 of first facesheet 313 and higher density 320 of second facesheet 317 are higher than lower density 322 of inner section 314.

When referring to the relative density of first facesheet 313 and second facesheet 317 with respect to inner section 314, including in the claims, the term "density" refers to average density over a volume that is representative of first facesheet 313, second facesheet 317, or inner section 314, as the case may be. For example, if inner section 314 is formed with many voids or spaces and first facesheet 313 is relatively solid, then inner section 314 may have a lower density than first facesheet 313 even though inner section 314 is made with a ceramic matrix composite material that, at a particular single point, may be as dense, or more so, than the material that is used to make first facesheet 313. In this example, the average density of inner section 314 over a representative volume may be lower than the average density of first facesheet 313 over a representative volume. Therefore, in this example, lower density 322 of inner section 314 may be lower than higher density 318 of first facesheet 313.

In accordance with an illustrative embodiment, inner section 314 may include first pins 324. First pins 324 may be made of a ceramic matrix composite material and may be bonded to first facesheet 313 and to second facesheet 317. First pins 324 may be bonded between first facesheet 313 and second facesheet 317 in an arrangement or pattern to provide a support structure for supporting first facesheet 313 and second facesheet 317.

In one illustrative example, first pins 324 may be bonded to first facesheet 313 and to second facesheet 317 in an arrangement to provide a truss core support structure. In this example, first pins 324 may be bonded to first facesheet 313 and to second facesheet 317 at first angle 326. In the present application, including in the claims, first angle 326 is determined relative to a line extending from normal to the facing surfaces of first facesheet 313 and second facesheet 317 where first facesheet 313 and second facesheet 317 are bonded to inner section 314. For example, without limitation, first angle 326 may be about 35 degrees or another appropriate angle.

Inconsistency 328 may occur in ceramic structure 302. Inconsistency 328 may occur during or after manufacturing of ceramic structure 302. Inconsistency 328 also may occur before ceramic structure 302 is installed on platform 304, while platform 304 with ceramic structure 302 installed thereon is in operation, or while platform 304 or ceramic structure 302 is out of operation for inspection or rework.

For example, inconsistency 328 may be a separation of first facesheet 313 or of second facesheet 317 from inner section 314. This separation of first facesheet 313 or second facesheet 317 from inner section 314 may be referred to as de-bonding. As another example, inconsistency 328 may be a separation between individual layers within first facesheet 313 or second facesheet 317. This type of inconsistency is referred to as layer delamination.

Inconsistency 328 may be a small dent or other depression in first facesheet 313 or in second facesheet 317 that does not extend into inner section 314. As another example, inconsistency 328 may include a larger depression or crushing of first facesheet 313 or of second facesheet 317 that does extend into inner section 314. Inconsistency 328 also may include cracking or piercing of first facesheet 313 or of second facesheet 317 that may or may not extend into inner section 314. As another example, inconsistency 328 may affect first facesheet 313, inner section 314, and second facesheet 317. Any denting, crushing, or piercing of ceramic structure 302 may be caused by the impact of debris or other objects or materials on ceramic structure 302 or by other causes.

In any case, inconsistency 328 may affect the performance of ceramic structure 302 in undesired ways. Therefore, it is desired that ceramic structure 302 be reworked to remove inconsistency 328 and to restore the capability of inner section 314 to carry or transfer shear loads between first facesheet 313 and second facesheet 317 as well as to stabilize first facesheet 313 and second facesheet 317. Illustrative embodiments provide methods for reworking ceramic structure 302 to remove inconsistency 328 and return ceramic structure 302 to a substantially original, functional condition before inconsistency 328 occurred. Illustrative embodiments may be particularly adapted to reworking ceramic structure 302 in which inconsistency 328 extends through first facesheet 313, second facesheet 317, or both, into inner section 314. Other illustrative embodiments may be particularly adapted to reworking ceramic structure 302 in which inconsistency 328 only affects first facesheet 313 or second facesheet 317.

Non-destructive inspection system 330 may be used to examine ceramic structure 302 to identify and evaluate inconsistency 328. Non-destructive inspection system 330 may include a human operator, a number of inspection devices or machines, or a human operator using or working in combination with one or more inspection devices or machines. For example, a human operator may make a visual inspection of ceramic structure 302, a tactile inspection of ceramic structure 302, or both a visual and tactile inspection to identify and evaluate inconsistency 328. The inspection performed by the human operator may or may not be aided using one or more devices or machines. Examples of non-destructive inspection devices or machines that may be used as part of non-destructive inspection system 330 may include, without limitation, a thermography device and an X-ray machine.

In accordance with an illustrative embodiment, destructive techniques may be used to more fully evaluate inconsistency 328 after the existence and location of inconsistency 328 is identified using non-destructive inspection system 330. For example, without limitation, destructive techniques may include cutting away or otherwise removing a portion of first facesheet 313, second facesheet 317, or inner section 314 to more fully evaluate the extent of inconsistency 328. Destructive techniques preferably should be used only in cases where use of such techniques will not significantly increase the extent of inconsistency 328.

Evaluation of inconsistency 328 using non-destructive inspection system 330 may include identifying the extent of inconsistency 328. For example, such an evaluation may include identifying the extent of inconsistency 328 in terms of the size of inconsistency 328 on a surface of ceramic structure 302 and how deeply inconsistency 328 extends into ceramic structure 302. By identifying the extent of inconsistency 328, an appropriate method for reworking ceramic structure 302 in accordance with an illustrative embodiment may be selected and performed.

An illustrative embodiment now will be described in more detail for reworking a particular example of inconsistency 328 that extends from first facesheet 313 into inner section 314. A similar process in accordance with an illustrative embodiment may be used to rework an inconsistency that affects first facesheet 313, inner section 314, and second facesheet 317.

After inconsistency 328 is identified and evaluated, a portion of first facesheet 313, including inconsistency 328, is removed using ceramic removal tool 332. A portion of inner section 314 including inconsistency 328 also may be removed using the same or different ceramic removal tool 332. The portion of first facesheet 313 to be removed and the portion of inner section 314 to be removed may be removed as one or more actions using one or more tools.

Ceramic removal tool 332 may be a ceramic cutting tool. For example, without limitation, ceramic removal tool 332 may include a rotary tool, such as a Dremel rotary tool or other rotary tool, a drill, or another tool for cutting or otherwise removing ceramic material from ceramic structure 302. In one example, ceramic removal tool 332 may be used to remove the desired portion of first facesheet 313 and the desired portion of inner section 314 by a single cutting operation into ceramic structure 302.

Removal of the portion of first facesheet 313 forms first aperture 336 in first facesheet 313. First aperture 336 extends entirely through first facesheet 313 from first side 338 of first facesheet 313 to second side 340 of first facesheet 313. First side 338 of first facesheet 313 may form an outer surface of ceramic structure 302. Second side 340 of first facesheet 313 is the side of first facesheet 313 adjacent to inner section 314.

Removal of the portion of inner section 314 forms second aperture 342 in inner section 314. Second aperture 342 may extend through inner section 314 from first aperture 336 to second facesheet 317.

First aperture 336 and second aperture 342 may have the same shape or may have different shapes. First aperture 336 and second aperture 342 may have any cross-sectional shape. For example, without limitation, the cross-sectional shape of first aperture 336 or second aperture 342 may be a circle, an oval, a square, or any other shape.

In accordance with an illustrative embodiment, first aperture 336 may be formed to provide one half of scarf joint 344. For example, first aperture 336 is defined by a side wall extending from first side 338 to second side 340 of first facesheet 313. In accordance with an illustrative embodiment, the side wall of first aperture 336 may be tapered to extend outward in a radial direction as the side wall extends from second side 340 to first side 338 of first facesheet 313.

The desired shapes of first aperture 336 and second aperture 342 may be formed using an appropriate tool, such as ceramic removal tool 332. For example, without limitation, the desired shapes of first aperture 336 and second aperture 342 may be formed using ceramic removal tool 332 with a feature for forming apertures of the desired shape.

In accordance with an illustrative embodiment, ceramic replacement material 346 is placed in second aperture 342. Ceramic replacement material 346 may be referred to as a ceramic plug. Ceramic replacement material 346 may completely or substantially fill second aperture 342. For example, without limitation, ceramic replacement material 346 may extend from second facesheet 317 to first aperture 336.

Ceramic replacement material 346 is made of a ceramic material, such as a ceramic matrix composite material. Ceramic replacement material 346 may be formed in a variety of different sizes, shapes, and configurations using a variety of fabrication techniques. The size, shape, and configuration of ceramic replacement material 346 to be used in any particular rework operation may be selected based on factors such as, for example, without limitation, the size and shape of second aperture 342 in inner section 314 and desired mechanical or other properties of ceramic structure 302 after rework is completed.

For example, without limitation, ceramic replacement material 346 may be cylindrical 350 or may have any other desired shape. Ceramic replacement material 346 may be solid 352 or hollow 354. If ceramic replacement material 346 is hollow 354, ceramic replacement material 346 may include wall 356 or other structure made of a ceramic material that defines space 358 in ceramic replacement material 346.

Ceramic replacement material 346 may be configured as ceramic sandwich structure 360. For example, without limitation, ceramic sandwich structure 360 may include third number of layers 362, fourth number of layers 364, and second pins 366. Third number of layers 362 and fourth number of layers 364 may be formed of one or more layers of a ceramic matrix composite material. Third number of layers 362 and fourth number of layers 364 form outer facesheets or skins for ceramic sandwich structure 360.

Second pins 366 may be made of a ceramic matrix composite material and may be bonded to third number of layers 362 and to fourth number of layers 364. Second pins 366 may be bonded between third number of layers 362 and fourth number of layers 364 in an arrangement or pattern to provide a support structure for supporting third number of layers 362 and fourth number of layers 364.

In one example, second pins 366 may be bonded to third number of layers 362 and to fourth number of layers 364 in an arrangement to provide a truss core support structure. In this example, second pins 366 may be bonded to third number of layers 362 and to fourth number of layers 364 at second angle 368. Second angle 368 is determined relative to a line extending from normal to the facing surfaces of third number of layers 362 and fourth number of layers 364 where third number of layers 362 and fourth number of layers 364 are bonded to second pins 366. In accordance with an illustrative embodiment, second angle 368 may be smaller than first angle 326 of first pins 324 in inner section 314. The smaller angle for the pin configuration in ceramic sandwich structure 360 allows for a sufficient number of second pins 366 to support third number of layers 362 and fourth number of layers 364, since the size of third number of layers 362 and fourth number of layers 364 may be relatively small. For example, without limitation, if first angle 326 is about 35 degrees, then second angle 368 may be about 25 degrees or another appropriate angle smaller than 35 degrees.

In another example, ceramic replacement material 346 may include ceramic sandwich structure 360 positioned inside space 358 defined by wall 356 of ceramic replacement material 346 that is hollow 354. In this example, wall 356 may extend around second pins 366 and between third number of layers 362 and fourth number of layers 364.

As a specific example, without limitation, for a relatively small size of second aperture 342, corresponding to a relatively small size of inconsistency 328 in inner section 314, ceramic replacement material 346 comprising solid 352 or hollow 354 ceramic replacement material 346 may be used. For example, without limitation, a relatively small size of inconsistency 328 may be an inconsistency requiring second aperture 342 in inner section 314 having a diameter equal to or less than about 1.5 inches.

In this example, fabrication of ceramic replacement material 346 may depend on the type of ceramic matrix composite material used to make first facesheet 313 and second facesheet 317 to provide a coefficient of thermal expansion match. For example, without limitation, ceramic replacement material 346 may be fabricated from a ceramic fiber slurry or ceramic hollow spheres molded to form solid 352 or hollow 354 ceramic replacement material 346 that fits snugly into second aperture 342.

As a more specific example, to rework ceramic structure 302 made of an aluminosilicate ceramic matrix reinforced with NEXTEL® 610 ceramic fiber, high alumina content tile or a mixture of about 50 percent by weight hollow alumina spheres with about 50 percent by weight alumina-silicate matrix may be cast to form solid 352 or hollow 354 ceramic replacement material 346. Ceramic replacement material 346 formed in this manner may be sintered at up to about 1500 degrees Fahrenheit to 2200 degrees Fahrenheit, or another appropriate temperature, to form a structurally rigid shape. Ceramic replacement material 346 then may be machined to fit in second aperture 342.

As another specific example, ceramic sandwich structure 360 may be used as ceramic replacement material 346 for reworking ceramic structure 302 where second aperture 342 is larger, corresponding to a larger inconsistency 328. For example, without limitation, a larger size of inconsistency 328 may be an inconsistency requiring second aperture 342 in inner section 314 having a diameter of greater than about 1.5 inches.

In this example, ceramic sandwich structure 360 may be fabricated from various fibers and ceramic matrix materials to tailor the coefficient of thermal expansion of ceramic sandwich structure 360 to that of first facesheet 313 and second facesheet 317 in ceramic structure 302. For example, without limitation, for reworking ceramic structure 302 made of an aluminosilicate ceramic matrix reinforced with Nextel 610 ceramic fibers, second pins 366 may be fabricated from an aluminosilicate ceramic matrix reinforced with NEXTEL® 610 ceramic fibers. Third number of layers 362 and fourth number of layers 364 each may include one, two, or more layers of an aluminosilicate ceramic matrix reinforced with NEXTEL® 610 ceramic fibers.

Ceramic sandwich structure 360 formed in this manner may be cured and sintered using the same profiles that were used for curing and sintering ceramic structure 302 in which ceramic sandwich structure 360 will be used. For example, without limitation, ceramic sandwich structure 360 may be sintered at up to about 1500 degrees Fahrenheit to 2500 degrees Fahrenheit, or another appropriate temperature to maximize structural integrity. Ceramic sandwich structure 360 then may be machined to fit either in second aperture 342 in ceramic structure 302 or in space 358 in hollow 354 ceramic replacement material 346.

In the example applications described above and other applications, ceramic replacement material 346 may be a ceramic matrix composite material made from materials other than alumina and aluminosilicates. For example, without limitation, ceramic replacement material 346 may comprise ceramic fibers including alumina, aluminosilicate, aluminoborosilicate, silicon carbide, silicon nitride, carbon, silicon boride, silicon boronitride, or other similar or different materials. For example, without limitation, ceramic replacement material 346 may include matrices formed from aluminosilicate, alumina, silicon carbide, silicon nitride, carbon, or other similar or different materials.

In accordance with an illustrative embodiment, number of ceramic layers 376 are placed into first aperture 336 in first facesheet 313 of ceramic structure 302. For example, without limitation, number of ceramic layers 376 may be placed into first aperture 336 to fill first aperture 336. Number of ceramic layers 376 that may be placed into first aperture 336 thus may equal the number of layers of first facesheet 313 that were removed to form first aperture 336. In this case, number of ceramic layers 376 may be referred to as replacement ceramic layers 377.

In accordance with another illustrative embodiment, number of ceramic layers 376 also may include overlay ceramic layers 378. Overlay ceramic layers 378 are placed on and bonded to replacement ceramic layers 377. For example, without limitation, overlay ceramic layers 378 may include one to five or more layers of ceramic material. Overlay ceramic layers 378 extend beyond replacement ceramic layers 377 onto the surface of first facesheet 313 beyond first aperture 336. For example, without limitation, overlay ceramic layers 378 may overlap scarf joint 344 by about 0.3 inches to about 1.0 inch or by another appropriate amount. Overlay ceramic layers 378 may be used to provide extra strength for the reworking of ceramic structure 302.

Number of ceramic layers 376 may include a number of layers of ceramic material that is uncured 379 or a number of layers of ceramic material that is uncured 379 in combination with a number of layers of ceramic material that is cured 380. Ceramic material that is uncured 379 also may be referred to as wet ceramic material or prepreg.

Number of ceramic layers 376 may be pre-formed 382 to fit in first aperture 336 and to be joined to first facesheet 313 at scarf joint 344. For example, number of ceramic layers 376 may be formed with a tapered edge that is shaped to join the tapered side wall of first aperture 336, as described above, to form scarf joint 344.

For example, without limitation, scarf joint 344 may be formed to provide an overlap of about 0.2 to about 0.3 inches for layers of number of ceramic layers 376 with layers of first facesheet 313. This amount of overlap has been shown to be effective in load distribution and restoring ceramic matrix composite material strength. However, scarf joint 344 may be formed to provide other amounts of overlap between layers of number of ceramic layers 376 and layers of first facesheet 313. Number of ceramic layers 376 comprises first surface area 384 and second surface area 386. When number of ceramic layers 376 is placed in first aperture 336, first surface area 384 may be aligned with first side 338 of first facesheet 313 to form a portion of the outer surface of ceramic structure 302. Second surface area 386 may be placed adjacent to ceramic replacement material 346 in second aperture 342. In the case where number of ceramic layers 376 includes ceramic layers that are uncured 379 and ceramic layers that are cured 380, a ceramic layer that is cured 380 may form second surface area 386 that is placed adjacent to ceramic replacement material 346. In this example, ceramic layers that are cured 380 are used as the inner layers of number of ceramic layers 376 that are positioned adjacent to ceramic replacement material 346 to provide structural support for other layers of number of ceramic layers 376 that are uncured 379 until the other layers are cured.

In accordance with an illustrative embodiment, ceramic particles 348 may be placed between number of ceramic layers 376 and first facesheet 313 when number of ceramic layers 376 is placed in first aperture 336. For example, ceramic particles 348 may be placed on first facesheet 313, on number of ceramic layers 376, or both, where first facesheet 313 and number of ceramic layers 376 are placed together to form scarf joint 344. Ceramic particles 348 also may be placed between number of ceramic layers 376 and ceramic replacement material 346 in second aperture 342. Ceramic particles 348 also may be placed between ceramic replacement material 346 in second aperture 342 and inner section 314 of ceramic structure 302 or between ceramic replacement material 346 in second aperture 342 and second facesheet 317 of ceramic structure 302, or both.

In any case, ceramic particles 348 may be provided in the form of slurry 349 of ceramic particles 348. Slurry 349 may be applied at the desired locations and in an appropriate amount by brushing, spraying, or another method of application.

The characteristics and amount of ceramic particles 348 that are placed between number of ceramic layers 376 and first facesheet 313 are selected such that heating ceramic particles 348 to an appropriate temperature and for an appropriate duration bonds number of ceramic layers 376 to first facesheet 313 by sintering. Similarly, heating of ceramic particles 348 to an appropriate temperature and for an appropriate duration may be used to sinter ceramic replacement material 346 in second aperture 342 to number of ceramic layers 376, to inner section 314 of ceramic structure 302, to second facesheet 317 of ceramic structure 302, or to any number of these structures in any combination.

Reworking ceramic structure 302 in accordance with an illustrative embodiment may include a number of heating operations. For example, these heating operations may include initial heating operations and sintering operations.

Initial heating operations may be performed to set ceramic replacement material 346, number of ceramic layers 376, or both, in place in ceramic structure 302 before sintering. Initial heating operations also may perform other functions, such as partial curing of ceramic replacement material 346, number of ceramic layers 376, or both, if needed. For example, without limitation, initial heating operations may be performed after ceramic replacement material 346 is placed in second aperture 342 and again after number of ceramic layers 376 are placed in first aperture 336. Alternatively, an initial heating operation may be performed once after placing both ceramic replacement material 346 in second aperture 342 and number of ceramic layers 376 in first aperture 336.

Initial heating operations may be performed at low temperature levels relative to sintering operations. For example, without limitation, initial heating operations may include heating up to about 500 degrees Fahrenheit or another appropriate temperature for about one hour or another appropriate time.

Heating of ceramic structure 302 for initial heating operations may be provided by heater 370. Heater 370 may include any appropriate device for heating ceramic structure 302 to a desired temperature for a desired duration. For example, without limitation, heater 370 may include heat lamp 372, heating blanket 374, or another heating device. Heat lamp 372 or heating blanket 374 may be operated to heat ceramic structure 302 at up to about 350 degrees Fahrenheit or more in a field, factory, or other setting. For example, heater 370 may be used to heat ceramic structure 302 in a field setting where ceramic structure 302 is mounted on platform 304, such as aerospace vehicle 306 or another vehicle, without removing ceramic structure 302 from platform 304.

Initial heating operations may be performed under partial vacuum conditions. For example, without limitation, initial heating operations may be performed in a vacuum of between about 5 to about 24 inches of mercury. The vacuum may be provided by vacuum system 388. For example, vacuum system 388 may include bag 390 and tape 392. Tape 392 may be used to attach bag 390 to ceramic structure 302 over the location of number of ceramic layers 376 to form a seal. Vacuum 394 then may be applied to bag 390.

Sintering operations may include heating ceramic particles 348 to an appropriate temperature for an appropriate duration to form the desired bonds between ceramic structures by sintering. Heating for sintering also may complete the curing of ceramic replacement material 346 or of number of ceramic layers 376, if needed. For example, heating for sintering may complete the curing of number of ceramic layers 376 that are uncured 379.

Sintering may take place at higher temperatures than the initial heating operations. For example, without limitation, sintering may include heating ceramic particles 348 at up to about 1500° F. to about 2200° F. or to another appropriate temperature for an appropriate duration. Sintering may be performed under partial vacuum conditions or may be performed outside of vacuum 394.

Heating for sintering may be provided by heater 370. For example, without limitation, in a factory or other similar setting, heater 370 may include oven 396. In this case, ceramic structure 302 may be placed in oven 396 to heat ceramic structure 302 to the appropriate temperature and for the appropriate duration for sintering.

In a field setting, such as where ceramic structure 302 is installed on platform 304, such as aerospace vehicle 306 or another vehicle, heater 370 may include other heat sources. For example, without limitation, heater 370 may include microwave 397 or laser 398 heating sources or other heating sources. Alternatively, in this setting, heating for sintering may be provided by the environment in which platform 304 on which ceramic structure 302 is installed is operated. For example, without limitation, heating of ceramic particles 348 for sintering may be provided by engine exhaust from engine 310 or by reentry heating of thermal protection system 308 on a spacecraft.

In another illustrative embodiment, it may be determined using non-destructive inspection system 330 that inconsistency 328 only affects a portion of first facesheet 313 and does not extend into inner section 314 of ceramic structure 302. Such an inconsistency may include broken fibers with loose ceramic particles in first facesheet 313. In this case, ceramic structure 302 may be reworked without removing a portion of first facesheet 313. For example, ceramic particles 348, such as in the form of slurry 349 of ceramic particles 348, may be applied to first facesheet 313 over the portion of first facesheet 313 including inconsistency 328. Slurry 349 provides rigidity and retains the loose and broken fibers of inconsistency 328. Number of ceramic layers 376 then may be placed onto first facesheet 313 over inconsistency 328. Ceramic particles 348 then may be sintered to bond number of ceramic layers 376 to first facesheet 313 over inconsistency 328. Sintering may be accomplished by a heating operation using heater 370, as described above.

The illustration of FIG. 3 is not meant to imply physical or architectural limitations to the manner in which different illustrative embodiments may be implemented. Other components in addition to, in place of, or both in addition to and in place of the ones illustrated may be used. Some components may be unnecessary in some advantageous embodiments. Also, the blocks are presented to illustrate some functional components. One or more of these blocks may be combined or divided into different blocks when implemented in different advantageous embodiments.

For example, inner section 314 of ceramic structure 302 may form a core support structure using components other than first pins 324 to form a structure that is different from the truss core support structure described. For example, without limitation, inner section 314 of ceramic structure 302 may be configured as a honeycomb, egg crate, or fluted, ceramic tile or foam, or other core structure formed of ceramic or ceramic matrix composite materials either alone or in combination with other materials.

The different components shown in FIGS. 4-14 may be combined with components in FIG. 3, used with components in FIG. 3, or a combination of the two. Additionally, some of the components in FIGS. 4-14 may be illustrative examples of how components shown in block form in FIG. 3 may be implemented as physical structures. The structures shown in FIGS. 4-14 are conceptual representations of structures in accordance with various illustrative embodiments. The structures shown in FIGS. 4-14 are provided to illustrate the relationships between component parts of structures in accordance with illustrative embodiments. The structures shown in FIGS. 4-14 may not illustrate actual physical structures or components.

Figure 4:
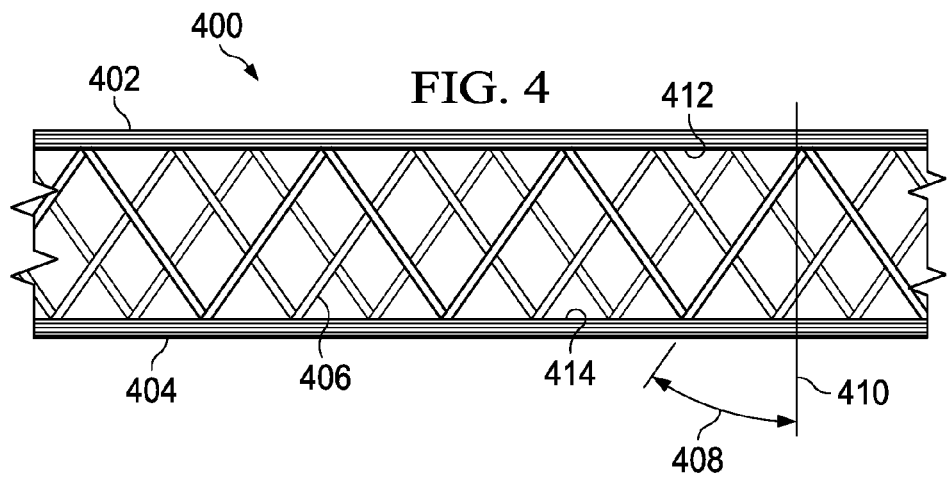
FIG. 4 is an illustration of a ceramic structure in which an illustrative embodiment may be implemented.

Turning now to FIG. 4, an illustration of a ceramic structure in which an illustrative embodiment may be implemented is depicted. In this example, ceramic structure 400 is an example of one implementation of ceramic structure 302 in FIG. 3.

Ceramic structure 400 is a ceramic sandwich structure including first facesheet 402 and second facesheet 404. In this example, each of first facesheet 402 and second facesheet 404 comprises four layers of ceramic matrix composite material. Pins 406 made of a ceramic matrix composite material form a truss core support structure supporting first facesheet 402 and second facesheet 404 on opposite sides of the core.

Pins 406 are bonded to first facesheet 402 and to second facesheet 404. For example, without limitation, the ends of pins 406 may be bent over and trapped between the layers of first facesheet 402 and second facesheet 404. Pins 406 extend from first facesheet 402 and from second facesheet 404 at angle 408 with respect to line 410 normal to facing surfaces 412 and 414 of first facesheet 402 and second facesheet 404, respectively. In this example, angle 408 is about 35 degrees.

Figure 5:
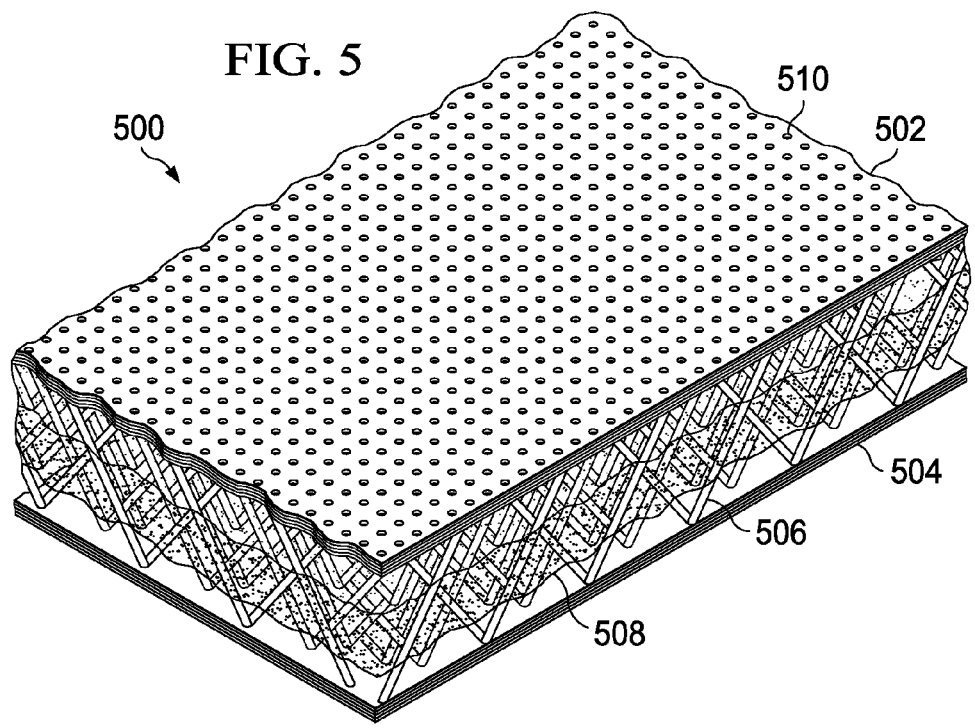
FIG. 5 is an illustration of another ceramic structure in which an illustrative embodiment may be implemented.

Turing now to FIG. 5, an illustration of another ceramic structure in which an illustrative embodiment may be implemented is depicted. In this example, ceramic structure 500 is an example of another implementation of ceramic structure 302 in FIG. 3.

Ceramic structure 500 is a ceramic sandwich structure including first facesheet 502 and second facesheet 504. In this example, each of first facesheet 502 and second facesheet 504 comprises four layers of ceramic matrix composite material. Pins 506 made of a ceramic matrix composite material form a truss core support structure supporting first facesheet 502 and second facesheet 504 on opposite sides of the core.

In this example, low-density ceramic insulation batting 508 is embedded in the truss core support structure as a bulk absorber. In this example, perforation holes 510 are formed in first facesheet 502 and second facesheet 504. The combination of ceramic insulation batting 508 and perforation holes 510 in ceramic structure 500 provides noise attenuation for applications requiring a noise attenuation feature.

Figure 6:
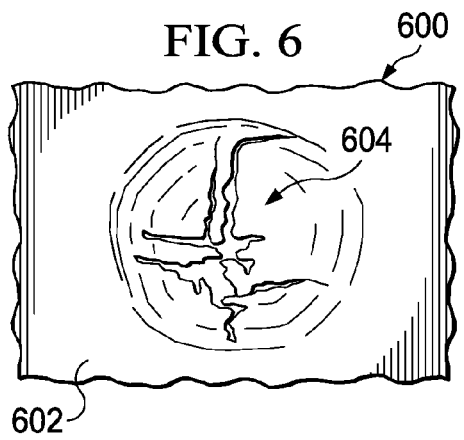
FIG. 6 is an illustration of a ceramic structure with an inconsistency in accordance with an illustrative embodiment.

Turning now to FIG. 6, an illustration of a ceramic structure with an inconsistency is depicted in accordance with an illustrative embodiment. In this example, ceramic structure 600 is an example of one implementation of ceramic structure 302 in FIG. 3.

Ceramic structure 600 is a ceramic sandwich structure including facesheet 602. Facesheet 602 is formed from a number of layers of ceramic material in this illustrative example. As depicted, facesheet 602 includes inconsistency 604. In this example, inconsistency 604 includes a depression formed into facesheet 602 and a hole penetration in facesheet 602.

Figure 7:
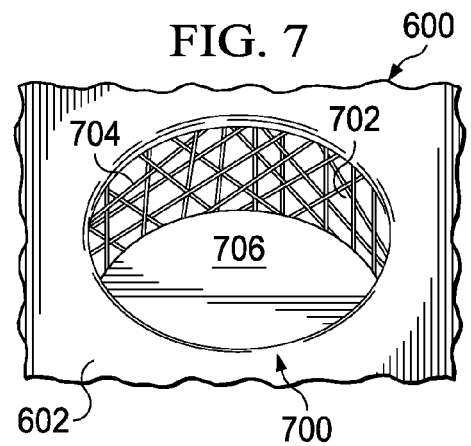
FIG. 7 is an illustration of a ceramic structure with portions of the ceramic structure, including an inconsistency, removed in accordance with an illustrative embodiment.

Turning now to FIG. 7, an illustration of ceramic structure 600 of FIG. 6 with portions of ceramic structure 600, including inconsistency 604, removed is depicted in accordance with an illustrative embodiment. In this example, a portion of facesheet 602, including inconsistency 604, has been removed from facesheet 602. Tapered area 700 is formed in facesheet 602 around the portion of facesheet 602 that has been removed for forming a scarf joint with facesheet 602.

A portion of inner section 702 of ceramic structure 600 also has been removed. In this example, inner section 702 comprises a truss core support structure formed of a number of ceramic pins 704. The portion of inner section 702 has been removed all the way to second facesheet 706 of ceramic structure 600.

Turning now to FIG. 8, an illustration of reworking a ceramic structure in accordance with a first illustrative embodiment is depicted. Ceramic structure 800 and other components in FIG. 8 are depicted in cross section. In this example, ceramic structure 800 is an example of one implementation of ceramic structure 302 in FIG. 3.

Ceramic structure 800 is a ceramic sandwich structure including first facesheet 802, second facesheet 804, and inner section 806. Inner section 806 forms a support structure between first facesheet 802 and second facesheet 804. In this example, first facesheet 802 and second facesheet 804 each include four layers of ceramic material. Inner section 806 includes a number of ceramic pins 808 forming a truss core support structure between first facesheet 802 and second facesheet 804.

First aperture 810 has been formed in first facesheet 802 and second aperture 812 has been formed in inner section 806 of ceramic structure 800. Ceramic replacement material 814 is placed in second aperture 812 in inner section 806. In this example, ceramic replacement material 814 is a hollow cylinder of ceramic material.

Replacement ceramic layers 816 are positioned to be placed in first aperture 810 in first facesheet 802 of ceramic structure 800. In this example, replacement ceramic layers 816 includes layers 818 of uncured ceramic material and layers 820 of cured ceramic material. Replacement ceramic layers 816 are positioned to place layers 820 of cured ceramic material adjacent to ceramic replacement material 814 in second aperture 812.

In this example, first aperture 810 is formed with tapered side wall 822. Replacement ceramic layers 816 are provided with complementary tapered outer edge 824. Replacement ceramic layers 816 may be joined to first facesheet 802 by joining complementary tapered outer edge 824 of replacement ceramic layers 816 to tapered side wall 822 of first aperture 810 to form a scarf joint.

Ceramic particles, indicated by dashed line 826, may be applied to first facesheet 802 where replacement ceramic layers 816 is to be joined to first facesheet 802. For example, ceramic particles may be applied to first facesheet 802 in the form of a slurry of ceramic particles. With replacement ceramic layers 816 in position in first aperture 810, the ceramic particles may be heated to an appropriate temperature and for an appropriate duration to bond replacement ceramic layers 816 to first facesheet 802 by sintering.

Turning now to FIG. 9, an illustration of a ceramic replacement material is depicted in accordance with an illustrative embodiment. FIG. 9 shows ceramic replacement material 814 in FIG. 8 as taken along lines 9-9 of FIG. 8. In this example, ceramic replacement material 814 is a hollow cylinder of ceramic material.

Turning now to FIG. 10, an illustration of reworking a ceramic structure is depicted in accordance with a second illustrative embodiment. Ceramic structure 1000 and other components in FIG. 10 are depicted in cross section. In this example, ceramic structure 1000 is another example of one implementation of ceramic structure 302 in FIG. 3.

Ceramic structure 1000 is a ceramic sandwich structure including first facesheet 1002, second facesheet 1004, and inner section 1006. Inner section 1006 forms a support structure between first facesheet 1002 and second facesheet 1004. In this example, first facesheet 1002 and second facesheet 1004 each include four layers of ceramic material. Inner section 1006 includes a number of ceramic pins 1008 forming a truss core support structure between first facesheet 1002 and second facesheet 1004.

First aperture 1010 has been formed in first facesheet 1002 and second aperture 1012 has been formed in inner section 1006 of ceramic structure 1000. Ceramic replacement material 1014 is placed in second aperture 1012 in inner section 1006. In this example, ceramic replacement material 1014 is a solid cylinder of ceramic material.

Replacement ceramic layers 1016 are positioned to be placed in first aperture 1010 in first facesheet 1002 of ceramic structure 1000. In this example, replacement ceramic layers 1016 includes four layers of cured ceramic material.

In this example, first aperture 1010 is formed with tapered side wall 1022. Replacement ceramic layers 1016 are provided with complementary tapered outer edge 1024. Replacement ceramic layers 1016 may be joined to first facesheet 1002 by joining complementary tapered outer edge 1024 of replacement ceramic layers 1016 to tapered side wall 1022 of first aperture 1010 to form a scarf joint.

Ceramic particles, indicated by dashed line 1026, may be applied to first facesheet 1002 where replacement ceramic layers 1016 is to be joined to first facesheet 1002. For example, ceramic particles may be applied to first facesheet 1002 in the form of a slurry of ceramic particles. With replacement ceramic layers 1016 in position in first aperture 1010, the ceramic particles may be heated to an appropriate temperature and for an appropriate duration to bond replacement ceramic layers 1016 to first facesheet 1002 by sintering.

Figure 11:
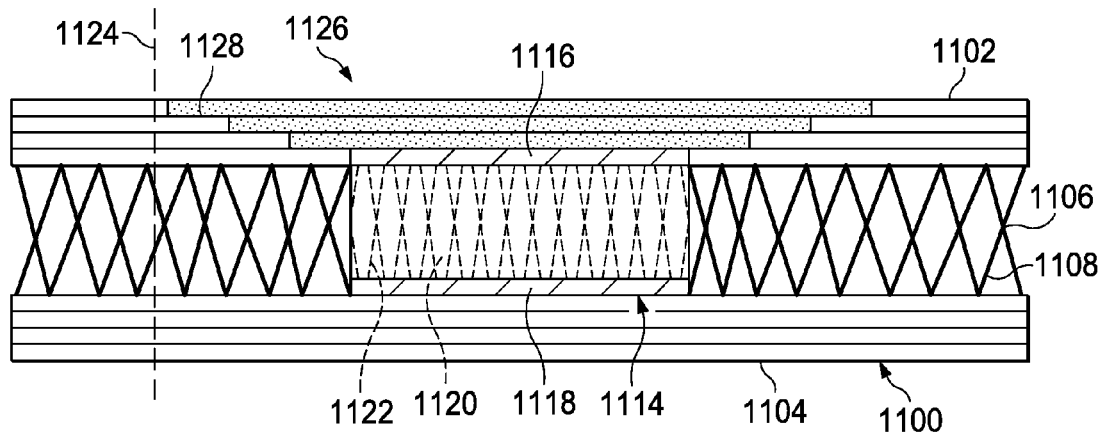
FIG. 11 is an illustration of reworking a ceramic structure in accordance with a third illustrative embodiment.

Turning now to FIG. 11, an illustration of reworking a ceramic structure is depicted in accordance with a third illustrative embodiment. Ceramic structure 1100 and other components in FIG. 11 are depicted in cross section. In this example, ceramic structure 1100 is another example of one implementation of ceramic structure 302 in FIG. 3.

Ceramic structure 1100 is a ceramic sandwich structure including first facesheet 1102, second facesheet 1104, and inner section 1106. Inner section 1106 forms a support structure between first facesheet 1102 and second facesheet 1104. In this example, first facesheet 1102 and second facesheet 1104 each include four layers of ceramic material. Inner section 1106 includes a number of ceramic pins 1108 forming a truss core support structure between first facesheet 1102 and second facesheet 1104.

Ceramic replacement material 1114 is placed in inner section 1106 of ceramic structure 1100. In this example, ceramic replacement material 1114 is a ceramic sandwich structure including third facesheet 1116, fourth facesheet 1118, and inner section 1120. Inner section 1120 forms a support structure between third facesheet 1116 and fourth facesheet 1118. In this example, inner section 1120 of ceramic replacement material 1114 includes a number of ceramic pins 1122 forming a truss core support structure between third facesheet 1116 and fourth facesheet 1118. As illustrated in FIG. 11, the angle of ceramic pins 1122 in ceramic replacement material 1114 with respect to line 1124 normal to first facesheet 1102 and normal to third facesheet 1116 may be smaller than the angle of ceramic pins 1108 in inner section 1106 of ceramic structure 1100 with respect to line 1124.

In this example, replacement ceramic layers 1126 have been bonded to first facesheet 1102 of ceramic structure 1100 adjacent to ceramic replacement material 1114 in inner section 1106 of ceramic structure 1100. Replacement ceramic layers 1126 are bonded to first facesheet 1102 of ceramic structure 1100 at scarf joint 1128. Replacement ceramic layers 1126 may be bonded to first facesheet 1102 by sintering of ceramic particles placed between replacement ceramic layers 1126 and first facesheet 1102 at scarf joint 1128.

Figure 12:
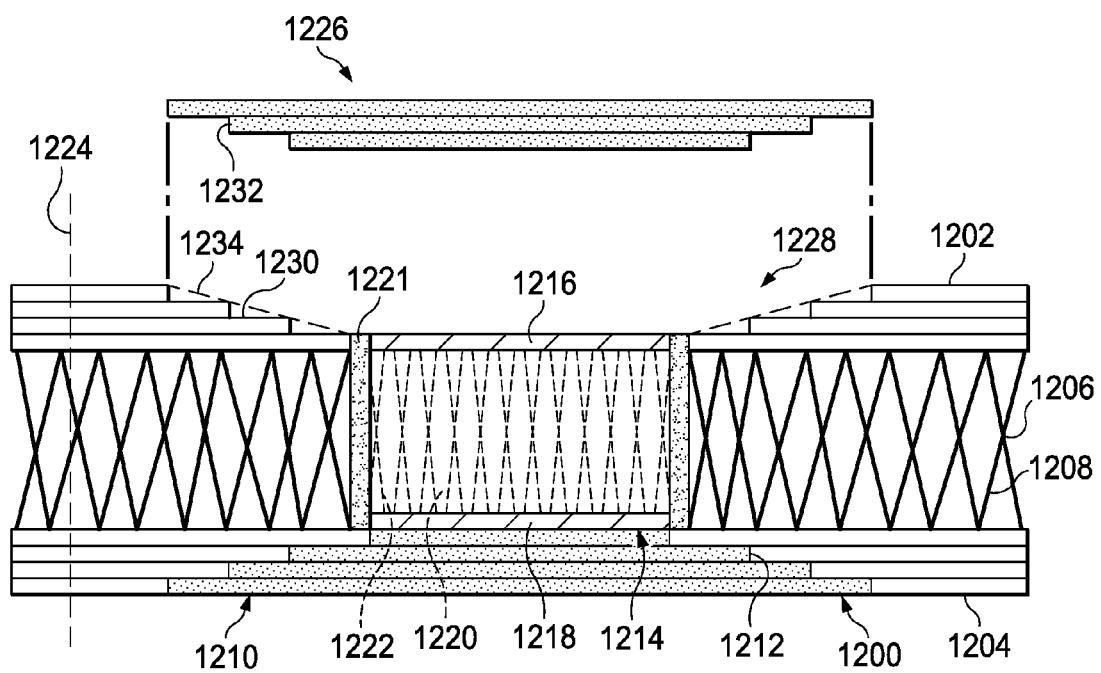
FIG. 12 is an illustration of reworking a ceramic structure in accordance with a fourth illustrative embodiment.

Turning now to FIG. 12, an illustration of reworking a ceramic structure is depicted in accordance with a fourth illustrative embodiment. Ceramic structure 1200 and other components in FIG. 12 are depicted in cross section. In this example, ceramic structure 1200 is another example of one implementation of ceramic structure 302 in FIG. 3.

Ceramic structure 1200 is a ceramic sandwich structure including first facesheet 1202, second facesheet 1204, and inner section 1206. Inner section 1206 forms a support structure between first facesheet 1202 and second facesheet 1204. In this example, first facesheet 1202 and second facesheet 1204 each include four layers of ceramic material. Inner section 1206 includes a number of ceramic pins 1208 forming a truss core support structure between first facesheet 1202 and second facesheet 1204.

In this example, replacement ceramic layers 1210 of ceramic material has been bonded to second facesheet 1204 of ceramic structure 1200. Replacement ceramic layers 1210 are bonded to second facesheet 1204 of ceramic structure 1200 at scarf joint 1212. Replacement ceramic layers 1210 may be bonded to second facesheet 1204 by sintering of ceramic particles placed between replacement ceramic layers 1210 and second facesheet 1204 at scarf joint 1212.

In this example, ceramic replacement material 1214 is placed in inner section 1206 of ceramic structure 1200 adjacent to replacement ceramic layers 1210 in second facesheet 1204. Ceramic replacement material 1214 is a ceramic sandwich structure including third facesheet 1216, fourth facesheet 1218, inner section 1220, and ceramic wall 1221. Inner section 1220 forms a support structure between third facesheet 1216 and fourth facesheet 1218. In this example, inner section 1220 of ceramic replacement material 1214 includes a number of ceramic pins 1222 forming a truss core support structure between third facesheet 1216 and fourth facesheet 1218. As illustrated in FIG. 12, the angle of ceramic pins 1222 in ceramic replacement material 1214 with respect to line 1224 normal to first facesheet 1202 and normal to third facesheet 1216 may be smaller than the angle of ceramic pins 1208 in inner section 1206 of ceramic structure 1200 with respect to line 1224. Ceramic wall 1221 extends around ceramic pins 1222 between third facesheet 1216 and fourth facesheet 1218.

Replacement ceramic layers 1226 are positioned to be placed in first aperture 1228 in first facesheet 1202 of ceramic structure 1200 adjacent to ceramic replacement material 1214 in inner section 1206 of ceramic structure 1200. In this example, replacement ceramic layers 1226 includes three layers of cured ceramic material.

In this example, first aperture 1228 is formed with tapered side wall 1230. Replacement ceramic layers 1226 are provided with complementary tapered outer edge 1232. Replacement ceramic layers 1226 may be joined to first facesheet 1202 by joining complementary tapered outer edge 1232 of replacement ceramic layers 1226 to tapered side wall 1230 of first aperture 1228 to form a scarf joint.

Ceramic particles, indicated by dashed line 1234, may be applied to first facesheet 1202 where replacement ceramic layers 1226 is to be joined to first facesheet 1202. For example, ceramic particles may be applied to first facesheet 1202 in the form of a slurry of ceramic particles. With replacement ceramic layers 1226 in position in first aperture 1228, the ceramic particles may be heated to an appropriate temperature and for an appropriate duration to bond replacement ceramic layers 1226 to first facesheet 1202 by sintering.

Figure 13:
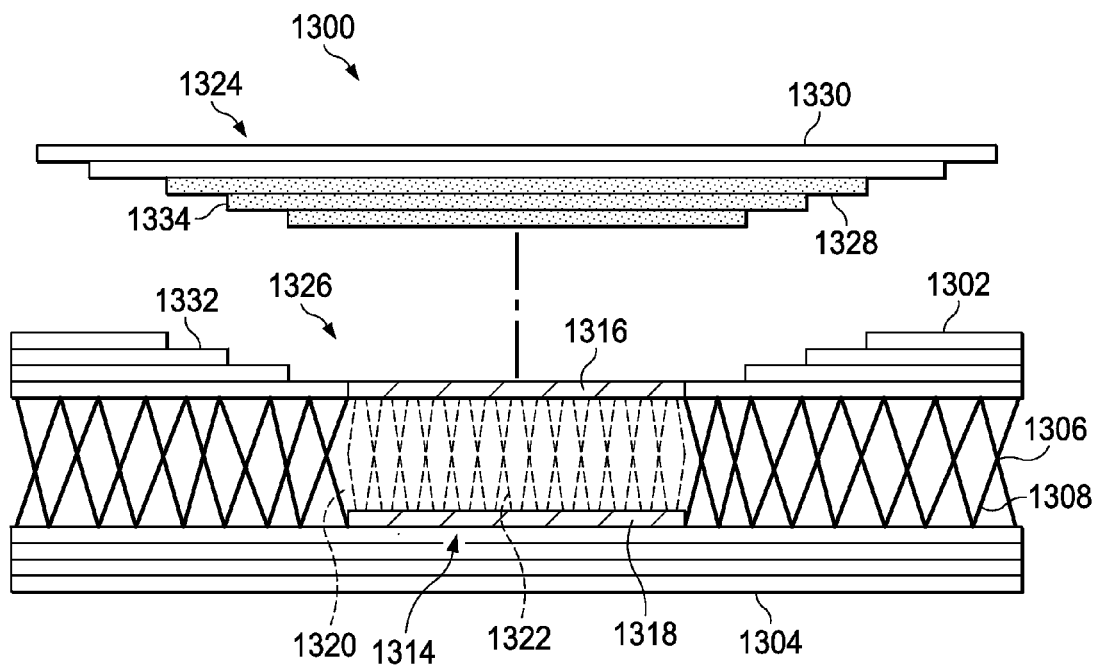
FIG. 13 is an illustration of reworking a ceramic structure in accordance with a fifth illustrative embodiment.

Turning now to FIG. 13, an illustration of reworking a ceramic structure is depicted in accordance with a fifth illustrative embodiment. Ceramic structure 1300 and other components in FIG. 13 are depicted in cross section. In this example, ceramic structure 1300 is another example of one implementation of ceramic structure 302 in FIG. 3.

Ceramic structure 1300 is a ceramic sandwich structure including first facesheet 1302, second facesheet 1304, and inner section 1306. Inner section 1306 forms a support structure between first facesheet 1302 and second facesheet 1304. In this example, first facesheet 1302 and second facesheet 1304 each include four layers of ceramic material. Inner section 1306 includes a number of ceramic pins 1308 forming a truss core support structure between first facesheet 1302 and second facesheet 1304.

Ceramic replacement material 1314 is placed in inner section 1306 of ceramic structure 1300. In this example, ceramic replacement material 1314 is a ceramic sandwich structure including third facesheet 1316, fourth facesheet 1318, and inner section 1320. Inner section 1320 forms a support structure between third facesheet 1316 and fourth facesheet 1318. In this example, inner section 1320 of ceramic replacement material 1314 includes number of ceramic pins 1322 forming a truss core support structure between third facesheet 1316 and fourth facesheet 1318.

Number of ceramic layers 1324 are positioned to be placed on first facesheet 1302 of ceramic structure 1300 adjacent to ceramic replacement material 1314 in inner section 1306 of ceramic structure 1300. In this example, number of ceramic layers 1324 includes replacement ceramic layers 1328 and overlay ceramic layers 1330.

Replacement ceramic layers 1328 are positioned to fill first aperture 1326 formed in first facesheet 1302 of ceramic structure 1300. In this example, first aperture 1326 is formed with tapered side wall 1332. Replacement ceramic layers 1328 are provided with complementary tapered outer edge 1334. Replacement ceramic layers 1328 may be joined to first facesheet 1302 by joining complementary tapered outer edge 1334 of replacement ceramic layers 1328 to tapered side wall 1332 of first aperture 1326 to form a scarf joint.

Overlay ceramic layers 1330 are placed over replacement ceramic layers 1328. Overlay ceramic layers 1330 are positioned to extend over the surface of first facesheet 1302 beyond first aperture 1326.

Ceramic particles may be applied to first facesheet 1302 where replacement ceramic layers 1328 and overlay ceramic layers 1330 are to be joined to first facesheet 1302. For example, ceramic particles may be applied to first facesheet 1302 in the form of a slurry of ceramic particles. With replacement ceramic layers 1328 and overlay ceramic layers 1330 in position on first facesheet 1302, the ceramic particles may be heated to an appropriate temperature and for an appropriate duration to bond replacement ceramic layers 1328 and overlay ceramic layers 1330 to first facesheet 1302 by sintering.

Figure 14:
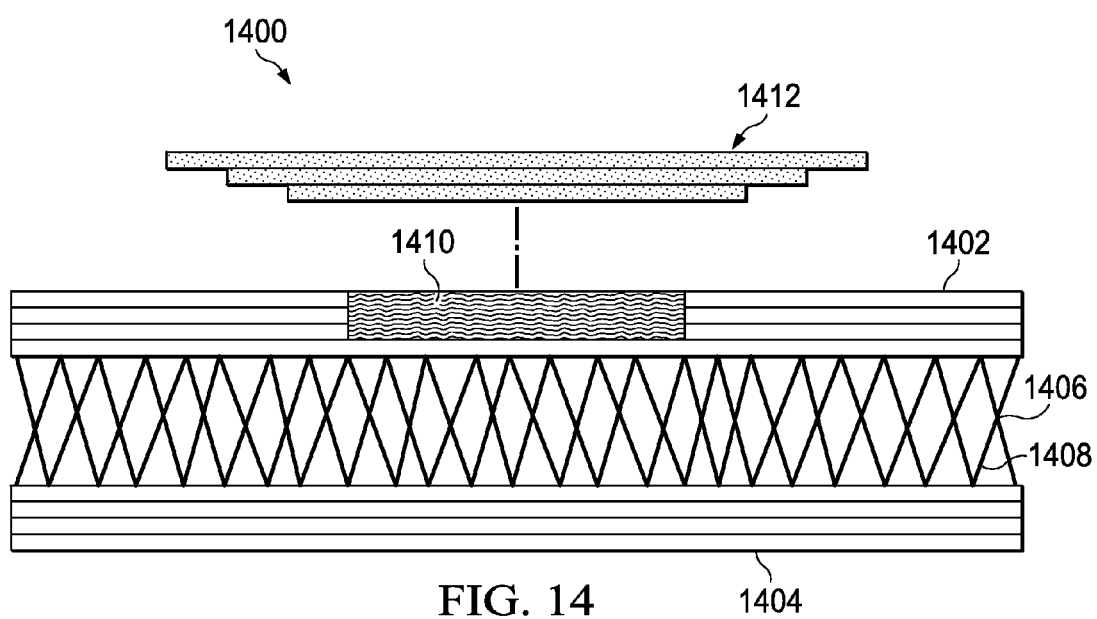
FIG. 14 is an illustration of reworking a ceramic structure in accordance with a sixth illustrative embodiment.

Turning now to FIG. 14, an illustration of reworking a ceramic structure is depicted in accordance with a sixth illustrative embodiment. Ceramic structure 1400 and other components in FIG. 14 are depicted in cross section. In this example, ceramic structure 1400 is another example of one implementation of ceramic structure 302 in FIG. 3.

Ceramic structure 1400 is a ceramic sandwich structure including first facesheet 1402, second facesheet 1404, and inner section 1406. Inner section 1406 forms a support structure between first facesheet 1402 and second facesheet 1404. In this example, first facesheet 1402 and second facesheet 1404 each include four layers of ceramic material. Inner section 1406 includes a number of ceramic pins 1408 forming a truss core support structure between first facesheet 1402 and second facesheet 1404.

Inconsistency 1410 is formed in first facesheet 1402. In this example, inconsistency 1410 is limited to first facesheet 1402 and does not extend into inner section 1406 of ceramic structure 1400. In this case, ceramic structure 1400 may be reworked without removing the portion of ceramic structure 1400 including inconsistency 1410.

In this example, number of ceramic layers 1412 are placed over first facesheet 1402 in the area of inconsistency 1410. Ceramic particles may be applied as a ceramic slurry to first facesheet 1402 between first facesheet 1402 and number of ceramic layers 1412. With number of ceramic layers 1412 in position on first facesheet 1402 over inconsistency 1410, the ceramic particles may be heated to an appropriate temperature and for an appropriate duration to bond number of ceramic layers 1412 to first facesheet 1402 by sintering.

In FIGS. 8 and 10-14 a number of examples of dovetailed scarf joints are shown. In these joints, stepped layers of ceramic material are overlaid to form the joints. In other illustrative embodiments, more smoothly tapered scarf joints may be used to join layers of ceramic materials.

Figure 15:
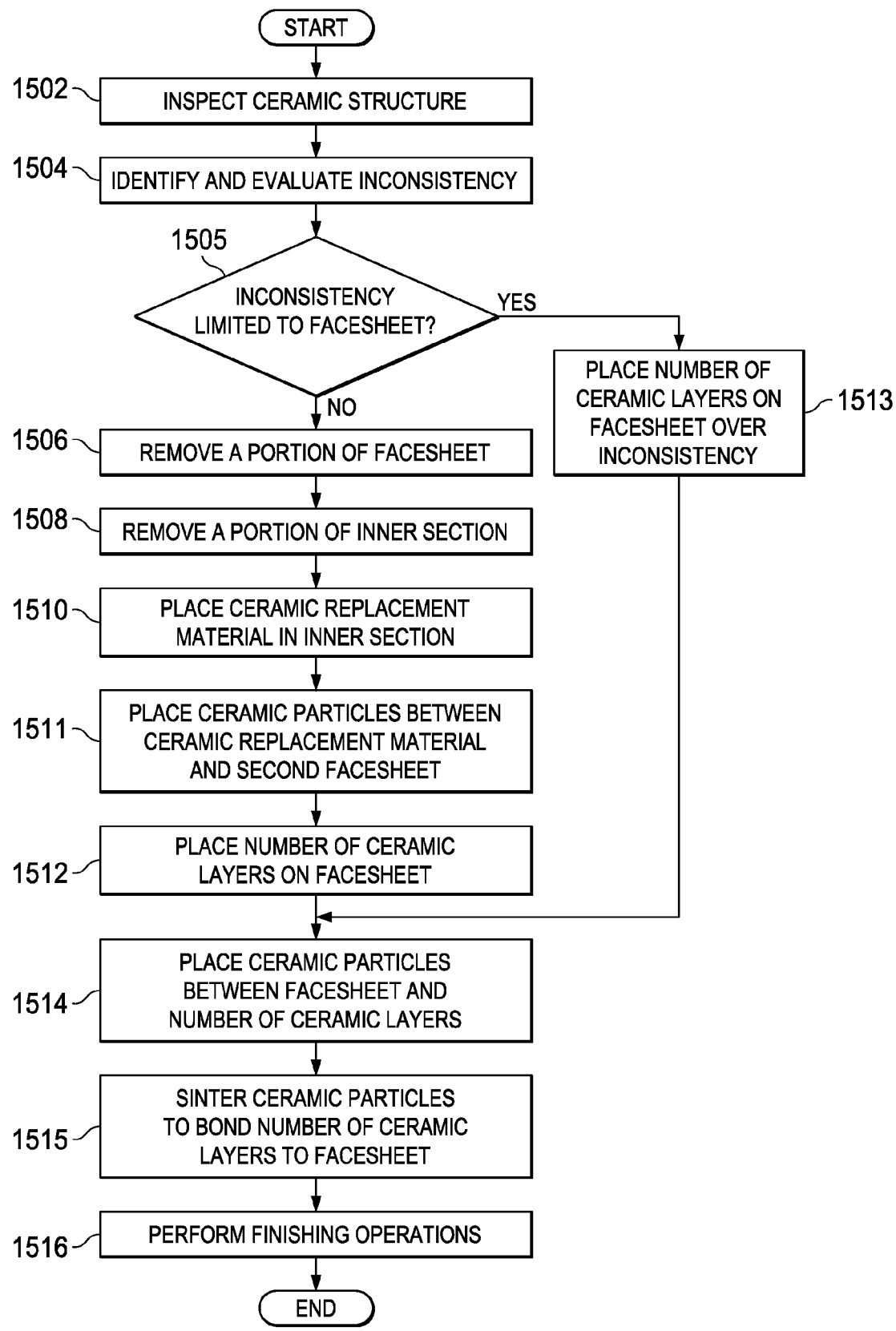
FIG. 15 is an illustration of a flowchart of a process for reworking a ceramic structure in accordance with an illustrative embodiment.

Turning now to FIG. 15, an illustration of a flowchart of a process for reworking a ceramic structure is depicted in accordance with an illustrative embodiment. In this example, the process of FIG. 15 may be performed in rework environment 300 in FIG. 3.

The process begins by inspecting the ceramic structure (operation 1502). Operation 1502 may include inspecting a ceramic sandwich structure using non-destructive techniques. From the inspection of operation 1502, an inconsistency in the ceramic structure may be identified and evaluated (operation 1504). For example, operation 1504 may include identifying the size of the inconsistency. Based on the evaluation of the inconsistency, it may be determined whether the inconsistency is limited to the facesheet of the ceramic sandwich structure (operation 1505).

If it is determined at operation 1505 that the inconsistency is not limited to the facesheet, then the inner section or core of the ceramic sandwich structure may be affected by the inconsistency. In this case, a portion of the facesheet is removed from the ceramic structure (operation 1506). The portion of the facesheet is removed in the area of the inconsistency in the facesheet. A portion of the inner section of the ceramic sandwich structure affected by the inconsistency also may be removed (operation 1508).

A ceramic replacement material is placed in the inner section of the ceramic structure from which the material was removed (operation 1510). The ceramic replacement material may be a ceramic plug. Characteristics of the ceramic plug may be selected based on the amount of material removed from the inner section of the ceramic sandwich structure that is to be replaced by the ceramic plug. Ceramic particles are placed between the ceramic replacement material and a second facesheet of the ceramic structure (operation 1511). Operation 1511 may include applying ceramic adhesive, such as in the form of a slurry including ceramic particles suspended in a slurry, on the second facesheet where the portion of the inner section was removed. The ceramic particles are used to bond the ceramic replacement material to the second facesheet.

A number of ceramic layers are placed on the facesheet in the area from which the ceramic material was removed (operation 1512). Operation 1512 may include placing replacement ceramic layers to replace the portion of the facesheet that was removed. Operation 1512 also may include applying a number of overlay ceramic layers on the replacement ceramic layers that extend onto the surface of the facesheet beyond the ceramic replacement layers.

If it is determined at operation 1505 that the inconsistency is limited to the facesheet, then the ceramic structure may be reworked without removing a portion of the ceramic structure. In this case, a number of ceramic layers may be placed on the facesheet directly over the inconsistency (operation 1513).

In any case, ceramic particles are placed between the facesheet and the number of ceramic layers (operation 1514). For example, the ceramic particles may be applied onto the facesheet as a slurry before the ceramic layers are placed on the facesheet. The ceramic particles are sintered to bond the number of ceramic layers to the facesheet (operation 1515). For example, operation 1515 may include raising the temperature of the ceramic particles to an appropriate temperature and for an appropriate duration for sintering. After sintering, finishing operations may be performed (operation 1516), with the process terminating thereafter.

Thus, the different illustrative embodiments provide various methods for reworking ceramic matrix composite materials. Sintering of ceramic particles is used to rework the ceramic matrix composite facesheet portion of a ceramic sandwich structure to restore missing layers and to withstand shear loading. A low-density ceramic plug is used to rework inconsistencies in the core portion of the ceramic sandwich structure to provide mechanical support to the restored facesheet portion without introducing locally high stress concentrations.

As a result, one or more of the different illustrative embodiments enable in-field or factory rework of inconsistencies occurring in the facesheet and extending into the core material of a ceramic matrix composite sandwich structure. By reworking a ceramic sandwich structure in the manner described herein, the mechanical properties, aerodynamic surface, environmental stability, and ability to withstand shear loading of the structure may be restored.

The different illustrative embodiments provide methods to rework inconsistencies of various depths and sizes that may occur during either manufacturing of a ceramic sandwich structure part or while the part is used in operation on the ground or in flight. Methods in accordance with illustrative embodiments use low-cost materials and quick turnaround processes to rework ceramic sandwich structure parts. These methods may be performed on parts that are on a vehicle as well as during part manufacturing. These methods may be used in any location by anyone trained to perform the rework methods described.

The flowcharts and block diagrams in the different depicted embodiments illustrate the structure, functionality, and operation of some possible implementations of apparatuses and methods in different illustrative embodiments. In this regard, each block in the flowcharts or block diagrams may represent a module, segment, function, or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

The description of the different illustrative embodiments has been presented for purposes of illustration and description, and is not intended to be exhaustive or to limit the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A ceramic structure comprising:
   a first facesheet, the first facesheet comprising a number of layers of a first ceramic material;
   an inner section comprising a second ceramic material bonded to the first facesheet and having a lower density than the first facesheet, the second ceramic material comprising first ceramic pins forming a support structure between the first facesheet and a second facesheet, wherein each of the first ceramic pins are bonded to the first facesheet at a first angle from normal to the first facesheet;

a ceramic replacement insert in the inner section, wherein the ceramic replacement insert comprises second ceramic pins, a third facesheet of ceramic material, and a fourth facesheet of ceramic material, wherein each of the second ceramic pins are bonded between the third facesheet and the fourth facesheet at a second angle from normal to the layers of the first ceramic material, wherein the second angle is smaller than the first angle; and a number of replacement ceramic layers adjacent to the ceramic replacement insert and bonded to the first facesheet.

2. The ceramic structure of claim 1, wherein the number of replacement ceramic layers is bonded to the first facesheet to form a scarf joint between the number of replacement ceramic layers and the first facesheet.

3. The ceramic structure of claim 2 further comprising a number of overlay ceramic layers bonded to the number of replacement ceramic layers and to the first facesheet, wherein the number of overlay ceramic layers extend over the scarf joint between the number of replacement ceramic layers and the first facesheet.

4. The ceramic structure of claim 1, wherein the ceramic replacement insert further comprises a ceramic cylinder having a wall that delineates a hollow space therein, the second ceramic pins being located in the hollow space, wherein the wall separates the second ceramic pins from the second ceramic material of the inner section.

5. The ceramic structure of claim 1, wherein the ceramic replacement insert further comprises a ceramic cylinder.

6. A method for reworking a ceramic structure, the method comprising:
   providing the ceramic structure, wherein the ceramic structure comprises a first facesheet, the first facesheet comprising a number of layers of a first ceramic material; and an inner section comprising a second ceramic material bonded to the first facesheet and having a lower density than the first facesheet, the second ceramic material comprising first ceramic pins forming a support structure between the first facesheet and a second facesheet, wherein each of the first ceramic pins are bonded to the first facesheet at a first angle from normal to the first facesheet;
   removing a portion of the first facesheet from the ceramic structure to form a first aperture;
   removing a portion of the inner section of the ceramic structure to form a second aperture, the second aperture extending from the first aperture into the inner section;
   placing a ceramic replacement material in the second aperture, wherein the ceramic replacement material comprises second ceramic pins, a third facesheet of ceramic material, and a fourth facesheet of ceramic material, wherein each of the second ceramic pins are bonded between the third facesheet and the fourth facesheet at a second angle from normal to the layers of the first ceramic material, wherein the second angle is smaller than the first angle;
   placing a number of replacement ceramic layers in the first aperture;
   placing ceramic particles between the first facesheet and the number of replacement ceramic layers; and
   sintering the ceramic particles to bond the number of replacement ceramic layers to the first facesheet.

7. The method of claim 6 further comprising:
   placing a number of overlay ceramic layers on the number of replacement ceramic layers, wherein the number of overlay ceramic layers extend onto the first facesheet beyond the portion of the first facesheet that is removed; and
   bonding the number of overlay ceramic layers to the number of replacement ceramic layers and the first facesheet.

8. The method of claim 6, wherein placing ceramic particles between the first facesheet and the number of replacement ceramic layers comprises applying a slurry of ceramic particles between the first facesheet and the number of replacement ceramic layers.

9. The method of claim 6, wherein sintering the ceramic particles comprises raising a temperature of the ceramic particles outside of a vacuum.

10. The method of claim 6, wherein the number of replacement ceramic layers is formed in a scarf joint to replace the portion of the first facesheet that is removed.

11. The method of claim 6, wherein:
    the inner section is bonded between the first facesheet and the second facesheet, the second facesheet comprising a number of layers of a third ceramic material and having a higher density than the inner section;
    the ceramic replacement material extends from the second facesheet to the first aperture; and
    further comprising placing second ceramic particles between the ceramic replacement material and the second facesheet to bond the ceramic replacement material to the second facesheet.

12. The method of claim 6, wherein the inner section is bonded between the first facesheet and the second facesheet, the second facesheet comprising a number of layers of a third ceramic material and having a higher density than the inner section, and further comprising:
    removing a portion of the second facesheet to form a third aperture, the second aperture extending from the first aperture to the third aperture;
    placing a number of second replacement ceramic layers in the third aperture;
    placing second ceramic particles between the second facesheet and the number of second replacement ceramic layers; and
    sintering the second ceramic particles to bond the number of second replacement ceramic layers to the second facesheet.

13. The method of claim 6, wherein the ceramic replacement material is selected from a solid ceramic material and a hollow ceramic material.

14. The method of claim 6, wherein the ceramic replacement material further comprises a ceramic wall around the ceramic pins and extending between the layers of ceramic material.

15. The method of claim 6, wherein the number of replacement ceramic layers comprise a number of layers of uncured ceramic material.

16. The method of claim 15, wherein the number of replacement ceramic layers further comprise a number of layers of cured ceramic material.

17. The method of claim 16, wherein placing the number of replacement ceramic layers in the first aperture comprises placing the number of layers of cured ceramic material between the ceramic replacement material and the number of layers of uncured ceramic material.

* * * * *